United States Patent
Kao

(10) Patent No.: US 10,263,715 B1
(45) Date of Patent: Apr. 16, 2019

(54) TRANSMITTER AND A POST-CURSOR COMPENSATION SYSTEM THEREOF

(71) Applicant: M31 Technology Corporation, Hsinchu County (TW)

(72) Inventor: Shuo-Ting Kao, New Taipei (TW)

(73) Assignee: M31 Technology Corporation, Hsinchu County (TW)

( * ) Notice: Subject to any disclaimer, the term of this patent is extended or adjusted under 35 U.S.C. 154(b) by 0 days.

(21) Appl. No.: 15/896,071

(22) Filed: Feb. 14, 2018

(51) Int. Cl.
  *H04B 17/15* (2015.01)
  *H04B 1/04* (2006.01)

(52) U.S. Cl.
  CPC .............. *H04B 17/15* (2015.01); *H04B 1/04* (2013.01)

(58) Field of Classification Search
  CPC .. H04L 5/0053; H04W 52/0225; H04B 1/123; H04B 1/0475
  See application file for complete search history.

(56) References Cited

U.S. PATENT DOCUMENTS

| | | | | |
|---|---|---|---|---|
| 2014/0086363 | A1* | 3/2014 | Yang | H03K 9/08 375/340 |
| 2015/0160880 | A1* | 6/2015 | Jang | G06F 3/0625 711/103 |
| 2016/0043761 | A1* | 2/2016 | Kim | H04B 1/0475 375/346 |
| 2017/0181081 | A1* | 6/2017 | Kim | H04W 52/028 |
| 2018/0070312 | A1* | 3/2018 | Tang | H04L 5/0053 |

* cited by examiner

*Primary Examiner* — Aristocratis Fotakis
(74) *Attorney, Agent, or Firm* — Winston Hsu

(57) ABSTRACT

A post-cursor compensation system includes a state detector that receives a signal on a data line to detect a predefined state, and accordingly generates a clear control signal; a synchronization detector that receives the signal on the data line and the clear control signal to detect at least one synchronization state, and accordingly generates a trigger signal; and a compensation generator that receives the trigger signal and accordingly generates a compensation signal.

20 Claims, 7 Drawing Sheets

TRANSMITTER AND A POST-CURSOR COMPENSATION SYSTEM THEREOF

BACKGROUND OF THE INVENTION

1. Field of the Invention

The present invention generally relates to a transmitter, and more particularly, to a post-cursor compensation system adaptable to a physical layer compliance test for a transmitter.

2. Description of the Prior Art

M-PHY, developed by MIPI Alliance, supports high-speed data rate up to 11.6 Gbits/second. A high-speed signal traveling through a backplane suffers from high-frequency losses, which can severely degrade content of the signal. Specifically, when a high-speed signal travels through a backplane, a present symbol may expand to adjacent intervals, for example, to a succeeding interval, thus resulting in post-cursor degradation that may interfere with neighboring symbols. Therefore, it is an object of designing and testing a transmitter with minimized effects of post-cursor such that a receiver can reliably and correctly receive the signal.

For high speed transmission, four speed classes or gears (i.e., gears 1-4 from low to high speed) have been defined by M-PHY. FIG. 1A shows a block diagram illustrating a system 100 of testing a transmitter (e.g., a gear-3 transmitter) in a high-speed burst mode (or HS-BURST). The transmitter is subjected to compliance random pattern (CR-PAT) to perform the testing. Specifically, a device under test (DUT) 11, for example, a transmitter complied with M-PHY (called M-TX in the specification) transmits a differential pair of signals via a pair of lines. The signals travel through a backplane such as package (PKG) and printed circuit board (PCB) 12. The signals then transfer through reference channels (e.g., CH1 and CH2) 13, which may be physical or software-implemented channels. Finally, the system 100 includes a terminal resistor 14 across the pair of lines. The terminal resistor 14 has impedance that is substantially equal to the impedance looking into a receiver.

Pre-emphasis may usually be adopted to increase the magnitude of higher frequencies of the signals in order to improve overall signal-to-noise ratio by minimizing effect of attenuation distortion caused by the reference channels 13.

According to M-PHY, a HS-BURST operation starts with a DIF-P state that is composed of serial "1"s with a length of fifteen or fewer symbols, followed by a synchronization (SYNC) state. In an M-PHY compliance test, first "0" in the SYNC state ordinarily suffers from post-cursor inter-symbol interference (ISI) caused by the DIF-P state. An antecedent of the ISI may include a channel loss between a transmitter and a receiver. FIG. 1B shows a waveform exemplifying signal degradation (designated by numeral 15 in FIG. 1B) caused by the post-cursor ISI. This degradation may be revealed and observed by eye height degradation (designated by numeral 16) in an eye diagram shown in FIG. 1C.

A need has thus arisen to propose a novel compensation scheme to minimize post-cursor degradation caused by the DIF-P state, so as to improve the eye diagram.

SUMMARY OF THE INVENTION

In view of the foregoing, it is an object of the embodiment of the present invention to provide a transmitter adaptable to a MIPI M-PHY compliance test. The post-cursor compensation system adopted in the transmitter is capable of effectively minimizing post-cursor degradation particularly pertaining to a DIF-P state.

According to one embodiment, a post-cursor compensation system is provided. The post-cursor compensation system comprises: a state detector, a synchronization detector and a compensation generator. The state detector operatively receives a signal on a data line to detect a predefined state, and accordingly generates a clear control signal, which is asserted when the predefined state is detected. The synchronization detector operatively receives the signal on the data line to detect at least one synchronization state, and accordingly generates a trigger signal, which is asserted when one of said at least one synchronization state is detected. The synchronization detector is controlled by the clear control signal and the trigger signal becomes de-asserted when the clear control signal is asserted. The compensation generator operatively receives the trigger signal and accordingly generates a compensation signal when the trigger signal becomes asserted.

According to one embodiment, a transmitter is provided. The transmitter comprises: a post-cursor compensation system, a parallel-to-serial converter, a first driver, a second driver and an adder. The post-cursor compensation system operatively receives a signal on a data line and accordingly generates a compensation signal. The parallel-to-serial converter operatively receives the signal on the data line and converts format of the signal from parallel format to serial format, thereby generating a serial signal. The first driver is configured to adjust the serial signal to generate an adjusted serial signal. The second driver is configured to adjust the compensation signal to generate an adjusted compensation signal. The adder is configured to superpose the adjusted compensation signal onto the adjusted serial signal. Additionally, the post-cursor compensation system comprises: a state detector, a synchronization detector and a compensation generator. The state detector operatively receives the signal on the data line to detect a predefined state, and accordingly generates a clear control signal, which is asserted when the predefined state is detected. The synchronization detector that receives the signal on the data line to detect at least one synchronization state, and accordingly generates a trigger signal, which is asserted when one of said at least one synchronization state is detected. The synchronization detector is controlled by the clear control signal and the trigger signal becomes de-asserted when the clear control signal is asserted. The compensation generator operatively receives the trigger signal and accordingly generates the compensation signal when the trigger signal becomes asserted.

According to one embodiment of the present invention, a method for post-cursor compensation is provided. The method comprises: receiving a signal on a data line to detect a predefined state and accordingly generating a clear control signal, wherein the clear control signal is asserted when the predefined state is detected; receiving the signal on the data line to detect at least one synchronization state and accordingly generating a trigger signal, wherein the trigger signal is asserted when one of said at least one synchronization state is detected, and the trigger signal becomes de-asserted when the clear control signal is asserted; and receiving the trigger signal and accordingly generating a compensation signal when the trigger signal becomes asserted.

These and other objectives of the present invention will no doubt become obvious to those of ordinary skill in the art

DETAILED DESCRIPTION

Figure 2:
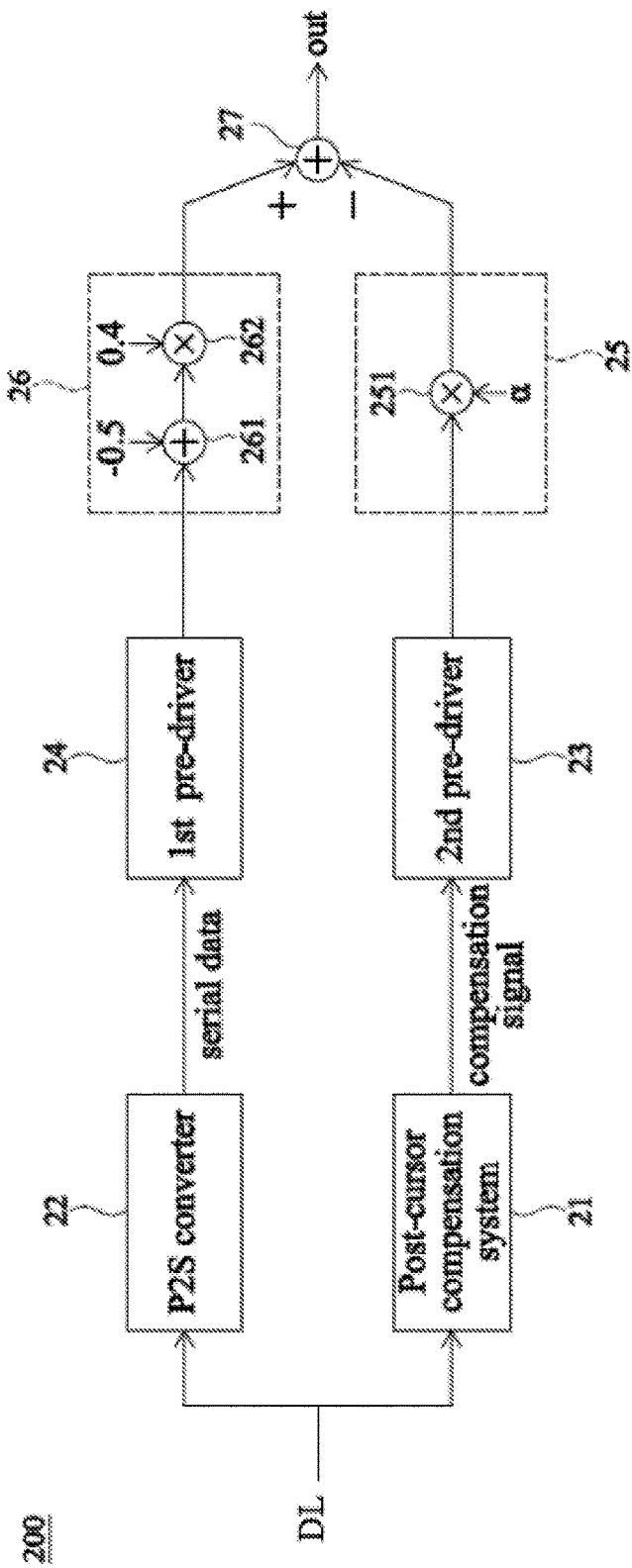
FIG. 2 shows a block diagram illustrating a transmitter according to one embodiment of the present invention.

FIG. 2 shows a block diagram illustrating a transmitter 200 according to one embodiment of the present invention. The transmitter 200 of the embodiment may be adaptable to a physical layer (e.g., M-PHY) compliance test.

In the embodiment, the transmitter 200 may include a post-cursor compensation system 21 that is configured to minimize post-cursor degradation specifically pertaining to a predefined state such as a DIF-P state (i.e., a state that is composed of, and could be transmitted in the form of, serial "1" bits with a predetermined length of fifteen or fewer symbols signaled on a differential data line). Specifically, the post-cursor compensation system ("compensation system" hereinafter) 21 may operatively receive a signal "DL" on the differential data line (from a data source) and accordingly generate a compensation signal, for example, a pulse of predetermined length (e.g., 4-6 unit intervals or UIs), so as to reduce voltage levels of the last few symbols of DIF-P state and the first few symbols of a synchronization state that follows the DIF-P state, thereby to minimize the post-cursor ISI.

In the embodiment, the compensation system 21 may have 20-bit latency The transmitter 200 of the embodiment may include a parallel-to-serial (P2S) converter 22 that operatively receives the signal "DL" one the data line and converts the received signal from parallel into serial format, thus generating a serial signal. The parallel-to-serial converter 22 may be implemented by a shift register circuit. In the embodiment, the parallel-to-serial converter 22 may have 23-bit latency.

The transmitter 200 of the embodiment may optionally include a first pre-driver 24 and a second pre-driver 23 that may operatively be coupled to receive outputs of the parallel-to-serial converter 22 and the compensation system 21, respectively. The first pre-driver 24 and the second pre-driver 23 may be configured to perform function such as voltage level shifting. The transmitter 200 of the embodiment may include a first driver 26 and a second driver 25 that may operatively receive outputs of the first pre-driver 24 and the second pre-driver 23, respectively. The first driver 26 and the second driver 25 (e.g., amplifiers) are configured to adjust (e.g., amplify) signals (received from the first pre-driver 24 and the second pre-driver 23) such that the adjusted signals may be efficiently transmitted through a communication channel and reliably received by a receiver.

Specifically, the first driver 26 of the embodiment may include an adder 261 and a multiplier (or amplifier) 262 that are connected in series. The second driver 25 of the embodiment may include a multiplier (or amplifier) 251 with an amplification factor α. In the embodiment, the amplification factor α is in a range between 0.006 and 0.05. With respect to output voltage swing of 0.2V of the first driver 26, the amplification factor α of the second driver 25 is equivalent to 3-25%.

The transmitter 200 of the embodiment may include an adder 27 that is configured or operable to superpose an output generated by the second driver 25 onto an output generated by the first driver 26. Alternatively, the adder 27 may superpose an output signal generated by the compensation system 21 onto an output signal generated by the parallel-to-serial converter 22 (if the first pre-driver 23, the second pre-driver 24, the first driver 25 and the second driver 26 are omitted) Accordingly, the adder 27 may generate an output signal with a minimized post-cursor ISI.

Figure 3A:
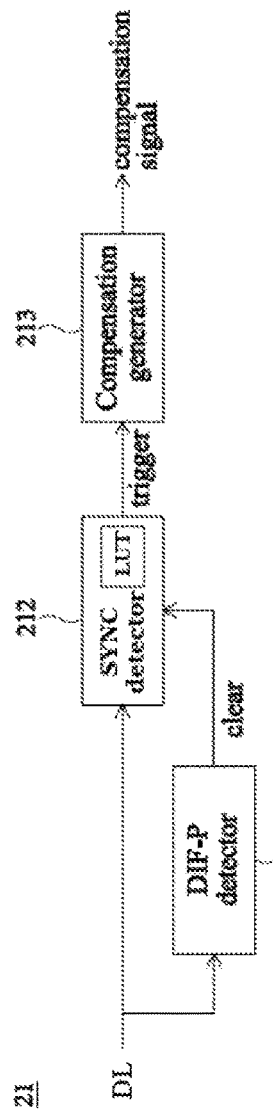
FIG. 3A shows a detailed block diagram illustrating the post-cursor compensation system of FIG. 2 according to one embodiment of the present invention.
Figure 3B:
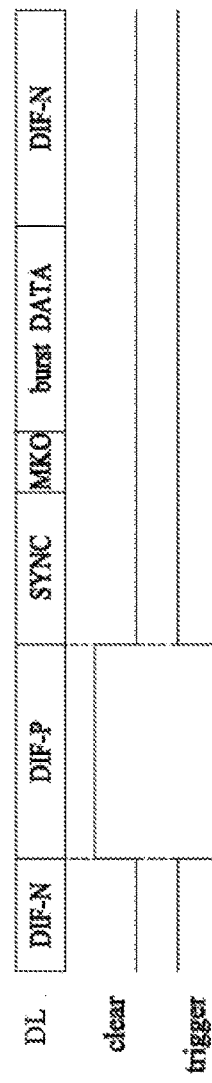
FIG. 3B shows exemplary timing diagrams of pertinent signals of FIG. 3A.

FIG. 3A shows a detailed block diagram illustrating the post-cursor compensation system 21 of FIG. 2 according to one embodiment of the present invention, and FIG. 3B shows exemplary timing diagrams of pertinent signals of FIG. 3A.

In the embodiment, the compensation system 21 may include a state detector such as DIF-P detector 211 that is configured to detect a predefined state such as a DIF-P state (i.e., a state composed of serial "1" bits with a predetermined length of fifteen or fewer symbols during a "prepare" period). According to M-PHY, there is another predefined state called DIF-N state (during a "stall" period) that is composed of serial "0" bits with a predetermined length. As shown in FIG. 3B, the DIF-N state represents a stall state, and precedes the DIF-P state or succeeds burst data symbols.

Specifically, the DIF-P detector 211 may operatively receive the signal "DL" on the data line, and accordingly generate a clear control signal, which is asserted (e.g., logically high "1") when the predefined state is detected (i.e., all bits of the received signal are "1" s). As DIF-P adopts 8b10b encoding scheme, the clear control signal is asserted when the received symbols are "1" s. As illustrated in FIG. 3B, the clear control signal becomes asserted (e.g., logically high "1") when the DIF-P detector 211 receives the DIF-P state, otherwise the clear control signal is de-asserted (e.g., logically low "0"). The DIF-P detector 211 may be implemented, for example, by using combinational logic such as an AND gate that compares input signal (i.e., signal "DL") with the DIF-P state.

The compensation system 21 of the embodiment may include a synchronization (SYNC) detector 212 that is configured or operable to detect a SYNC state. According to M-PHY, as shown in FIG. 3B, the SYNC state follows the DIF-P state in a burst mode operation. Subsequently, the burst data (or the payload) start with a marker 0 (MK0) symbol.

Specifically, the SYNC detector 212 may operatively receive the signal "DL" on the data line, and accordingly generate a trigger signal, which is asserted (e.g., logically high "1") when the received signal correspond to one of predetermined SYNC states. The SYNC detector 212 of the embodiment may be further controlled by the clear control signal (generated by the DIF-P detector 211). Specifically, the trigger signal may be de-asserted (e.g., logically low "0") or be cleared when the clear control signal is asserted (e.g., logically high "1") as illustrated in FIG. 3B. It is noted that the asserted trigger signal may be latched until the SYNC detector 212 is cleared by the asserted clear control signal.

The predetermined SYNC states may be pre-stored in a lookup table inside the SYNC detector 212, and the SYNC detector 212 may include a compare circuit that compares input signal with one SYNC state retrieved from the lookup table. In a specific embodiment, only one of the predetermined SYNC states is chosen beforehand, and the chosen SYNC state is used in the M-PHY compliance test. In this case, the SYNC detector 212 may be implemented, for example, by combinational logic such as an AND gate that compares input signal with the chosen SYNC state. An output (i.e., the trigger signal) of the AND gate becomes asserted and latched when the input signal is equal to the SYNC state; otherwise, the output of the AND gate is de-asserted.

In the embodiment, the compensation system 21 may include a compensation generator 213 that is configured to generate a compensation signal. Specifically, the compensation generator 213 may operatively receive the trigger signal (generated by the SYNC detector 212), and accordingly generate the compensation signal. The compensation generator 213 may generate a pulse of predetermined length (e.g., 4-6 unit intervals or UIs) acting as the compensation signal when the trigger signal becomes asserted (e.g., "1").

The flow of operations performed by the compensation system 21 includes the following steps:

(A) receiving a signal on a data line to detect a predefined state and accordingly generating a clear control signal, wherein the clear control signal is asserted when the predefined state is detected;

(B) receiving the signal on the data line to detect at least one synchronization state and accordingly generating a trigger signal, wherein the trigger signal is asserted when one of said at least one synchronization state is detected, and the trigger signal becomes de-asserted when the clear control signal is asserted; and (C) receiving the trigger signal and accordingly generating a compensation signal when the trigger signal becomes asserted.

At step (A), the signal "DL" on the differential data line is received and it is detected whether the signal "DL" on the data line is in a predefined state (e.g. DIF-P state). Accordingly, a clear control signal is generated to indicate whether or not the signal is in the predefined state. If the predefined state is detected, the clear control signal is asserted. At step (B), it is detected whether the signal "DL" on the data line is in at least one synchronization state (e.g. SYNC state). Accordingly, a trigger signal is generated to indicate whether or not the signal is in the synchronization state. If the synchronization state is detected, the trigger control signal is asserted; and if the clear control signal is asserted, the trigger signal becomes de-asserted. At step (C), when the trigger signal becomes asserted, a compensation signal is generated.

In one embodiment, if the trigger signal is asserted, the asserted trigger signal will be latched until the clear control signal is asserted. In addition, the compensation signal is asserted only when the trigger signal is de-asserted at a preceding time as well as the trigger signal is asserted at a present time.

In one embodiment, the step of detecting the synchronization state comprises: storing a plurality of synchronization states; and comparing the signal "DL" on the data line with one synchronization state.

In one embodiment, the step of generating the compensation signal comprises: providing a first D flip-flop and at least one series-connected second D flip-flop that is connected in series with the first D flip-flop, wherein a first one of said at least one second D flip-flop following the first D flip-flop; and performing a logic AND operation on an output of the first D flip-flop and an inverted output of a last one of said at least one second D flip-flop to accordingly generate the compensation signal. In addition, the first D flip-flop operatively receives the trigger signal and accordingly generates an output that is operatively received by the first one of said at least one second D flip-flop.

Figure 4A:
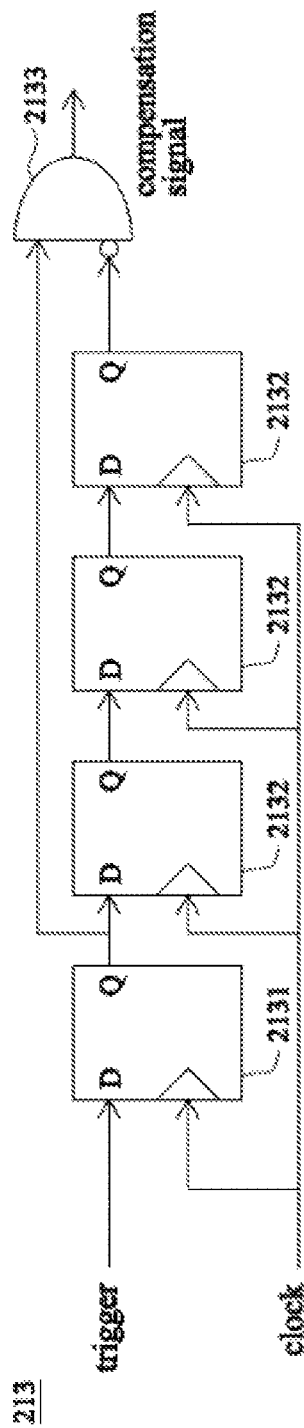
FIG. 4A shows a detailed block diagram illustrating the compensation generator of FIG. 3A.
Figure 4B:
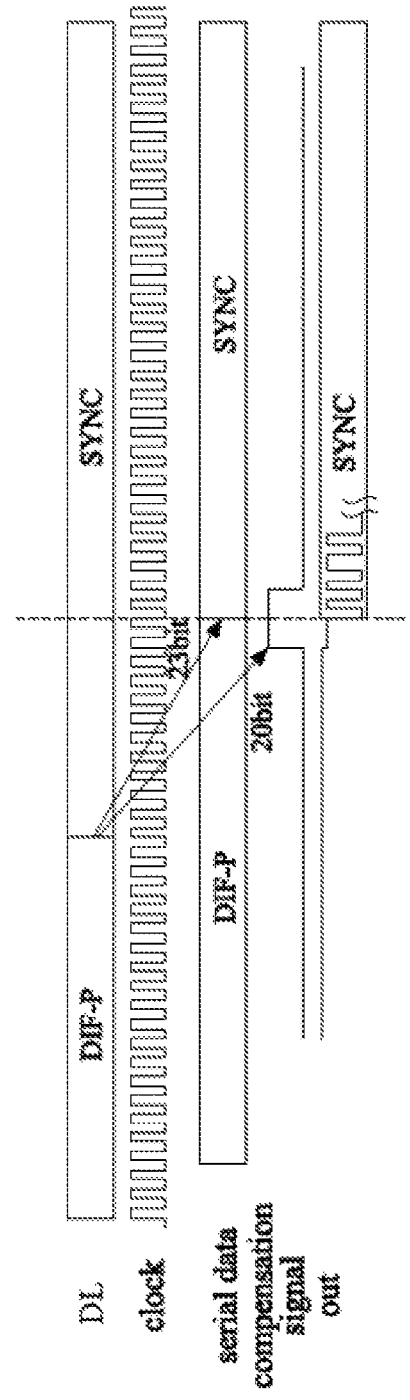
FIG. 4B shows exemplary timing diagrams of pertinent signals of FIG. 4A.

FIG. 4A shows a detailed block diagram illustrating the compensation generator 213 of FIG. 3A, and FIG. 4B shows exemplary timing diagrams of pertinent signals of FIG. 4A. In the embodiment, the compensation generator 213 may include a first D flip-flop 2131 and at least one (e.g., three in the embodiment) second D flip-flop 2132 that are connected in series, where the at least one second D flip-flop 2132 follows the first D flip-flip 2131. The first/second D flip-flip 2131/2132 is used as a delay unit that captures an input at an input node D, and the input becomes an output at an output node Q at a succeeding time (for example, at a rising edge in a next clock period). The output at the output node Q does not change at other times. Specifically, the first D flip-flop 2131 may operatively receive the trigger signal (generated by the SYNC detector 212) and accordingly generate an output, which may operatively be received by the beginning second D flip-flop 2132. The first D flip-flop 2131 and the second D flip-flop 2132 may be controlled (or synchronized) by a clock signal. The compensation generator 213 may further include an AND gate 2133 that may operatively receive the output of the first D flip-flop 2131 and an inverted output of the last second D flip-flop 2132, and accordingly generate the compensation signal. Moreover, the length of the pulse of the compensation signal is related to the number of the first and the second D flip-flops 2131 and 2131. For example, if the number of the first and the second D flip-flops 2131 and 2131 in the compensation generator 213 are N, the length of the pulse of the compensation signal will be (N−1)*T, wherein T is a delay time caused by a single D flip-flop. By properly configuring the delay time of the D flip-flops, the pulse of the predetermined length e.g., 4-6 unit intervals or UIs can be derived.

The compensation signal (or the pulse of predetermined length) may become asserted (e.g., "1") only when the trigger signal is de-asserted (e.g., "0") at a preceding time (e.g., at a rising edge in a previous clock period) and the trigger signal is asserted (e.g., "1") at a present time (e.g., at a rising edge in a present clock period), otherwise the compensation signal is de-asserted (or no pulse is generated).

It is noted that half-rate clocking is adopted in the embodiment, and the generated pulse has a length equal to three periods 3T of the clock signal. In general, the number of the periods of the pulse length is equal to the number of the series-connected second D flip-flops 2132. As two bits are transmitted in one period by using half-rate clocking, six bits (equivalent to six unit intervals (UIs)) are thus transmitted during the generated pulse (i.e., 3T). If full-rate clocking is adopted, in which one bit is transmitted in one period, three bits are thus transmitted during the generated pulse (i.e., 3T). If quarter-rate clocking is adopted, in which four bits are transmitted in one period, twelve bits are thus transmitted during the generated pulse (i.e., 3T).

As illustrated by FIG. 4B, the compensation system. 21 may have 20-bit latency and the parallel-to-serial converter 22 may have 23-bit latency, and thus the pulse of the compensation signal can overlap the transition between the DIF-P state and the synchronization state, thereby to properly compensate and minimize post-cursor degradation. It should be noted that the latency of the compensation system 21 and the latency of the parallel-to-serial converter 22 may be varied with their internal designs. However, it is necessary to properly control their respective latencies thereby to guarantee that the pulse of the compensation signal can overlap the transition between the DIF-P state and the synchronization state.

Figure 5A:
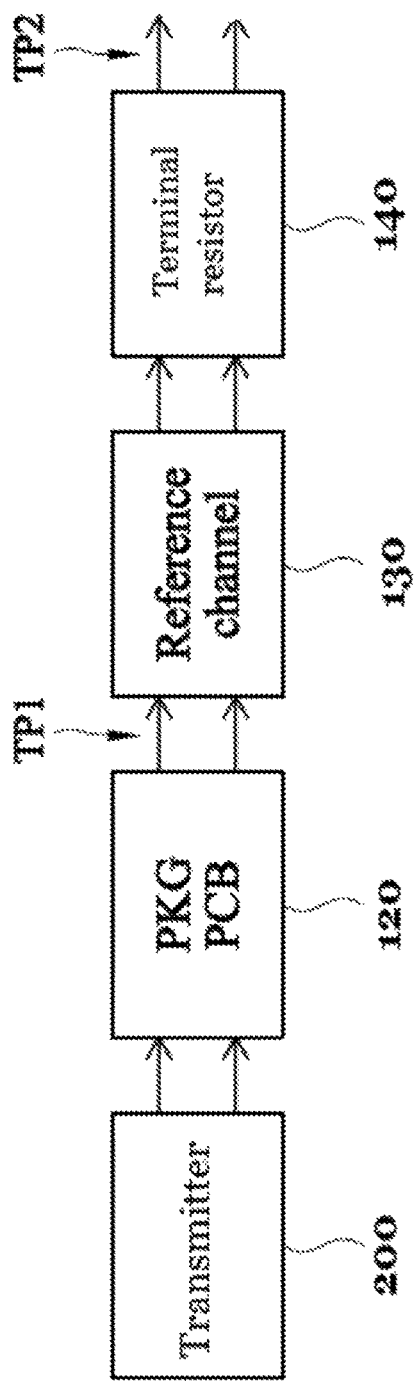
FIG. 5A shows a test environment where a transmitter with the post-cursor compensation is applied according to one embodiment of the present invention.
Figure 5B:
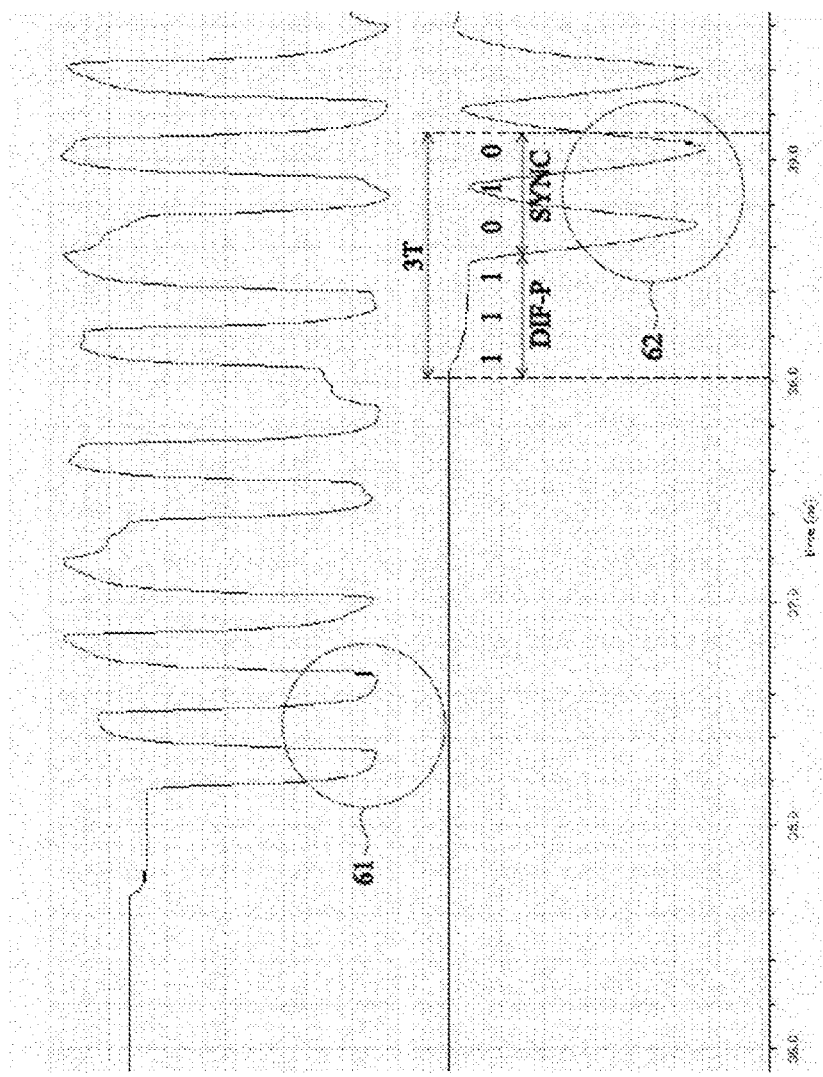
FIG. 5B shows two waveforms where the upper one is measured at the first test point (TP1) and the lower one is measured at the second test point (TP2) of FIG. 5A.
Figure 5C:
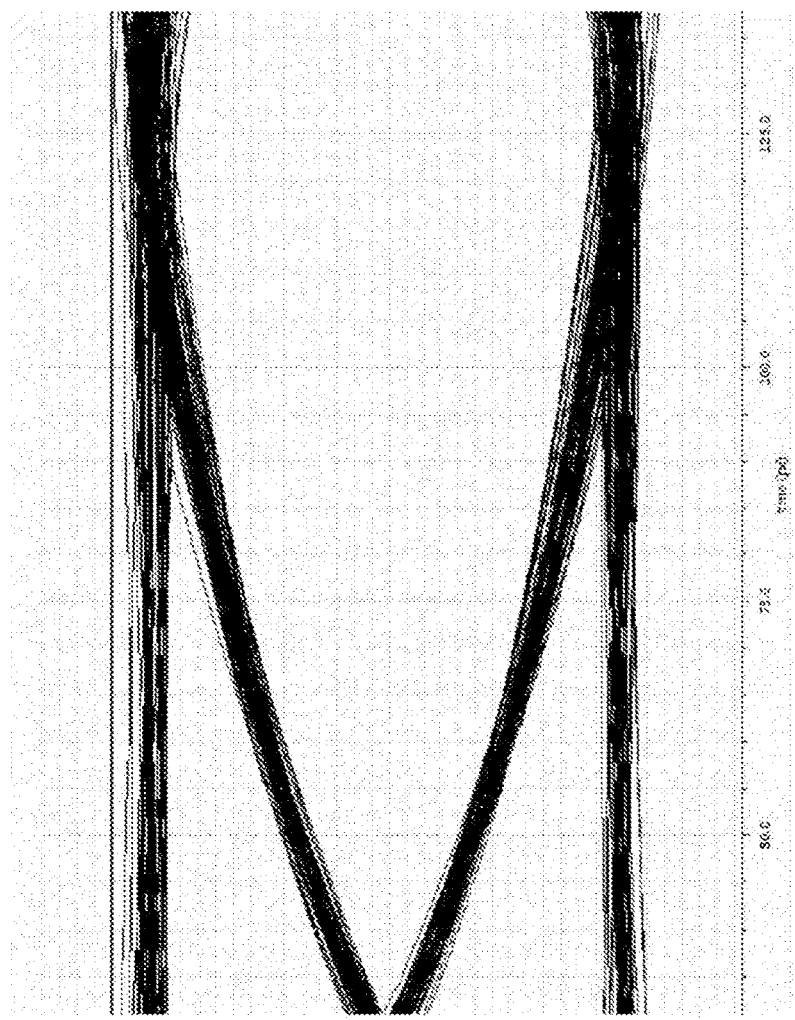
FIG. 5C shows an eye diagram corresponding to the lower waveform of FIG. 5B.

According to the embodiment as proposed above, the transmitter 200 adopting the post-cursor compensation system 21 may effectively minimize post-cursor degradation. FIGS. 5A-5C illustrates operating a transmitter with post-cursor compensation in a test environment according to one embodiment of the present invention. FIG. 5A shows the test environment where the transmitter with post-cursor compensation is applied. The test environment illustrated in FIG. 5A is intended to simulate signal transmission paths in practical applications, thereby to evaluate the overall performance of the transmitter on signal integrity (SI). As illustrated, a transmitter with post-cursor compensation, i.e., the transmitter 200 transmits a differential pair of signals via a pair of lines. The signals travel through a backplane such as package (PKG) and printed circuit board (PCB) 120. The signals then transfer through a reference channel 130, which may be physical or software-implemented channels. Typically, the reference channel 130 is intended to simulate channel loss in practical application, which is generally the main reason leading to the post-cursor ISI. Additionally, there is terminal resistor 140 across the pair of lines. The terminal resistor 140 has impedance that is substantially equal to the impedance looking into a corresponding receiver.

Figure 1A:
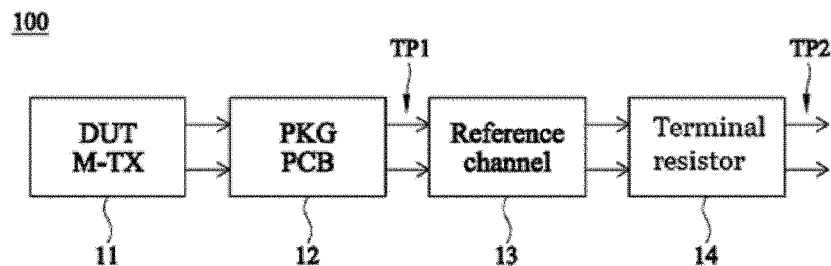
FIG. 1A shows a block diagram illustrating a conventional system of testing a transmitter in a high-speed burst mode.
Figure 1B:
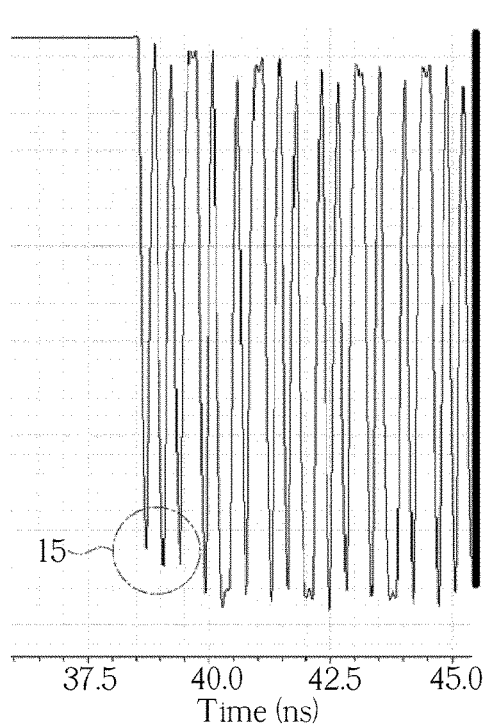
FIG. 1B shows a conventional waveform at a receiver side exemplifying signal degradation caused by post-cursor ISI.
Figure 1C:
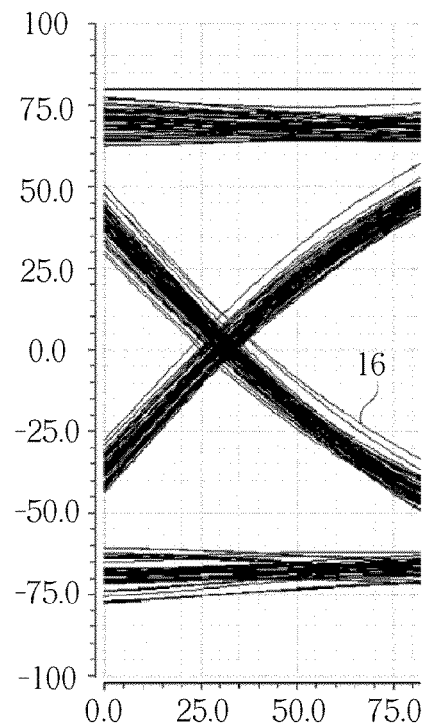
FIG. 1C shows an eye diagram corresponding to the waveform of FIG. 1B.

FIG. 5B shows waveforms at the first test point (TP1) and the second test point (TP2) of FIG. 5A, and FIG. 5B shows an eye diagram corresponding to the waveform of FIG. 5B. As designated by numerals 61 and 62 in FIG. 5B, signals no longer degrade as in FIG. 1B. It is observed in FIG. 5C that the eye height in an eye diagram is substantially increased.

Specifically, as shown in FIG. 5B, during the three periods 3T of the generated pulse of the compensation signal, voltage of the last three bits (e.g., "111") of DIF-P state and the succeeding first three bits (e.g., "010") of SYNC state drops by at least 3% or 6 mV with respect to the output voltage of the first driver 26. The amount of dropped voltage may be determined by parameter (e.g., amplification factor) of the second driver 25.

In a gear-3B channel-2 (CH2) testing, for example, eye height may substantially improve by 27.6% with only 5-10% increase in circuit area due to the parallel-to-serial converter 22, 1-5% increase in circuit area of the driver compared to a conventional driver, and additional current consumption of 0.3 mA for driving the generated pulse. It is appreciated that the present embodiment may be well adapted to other speed classes such as gear-4.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A post-cursor compensation system, comprising:
   a state detector that operatively receives a signal on a data line to detect a predefined state, and accordingly generates a clear control signal, which is asserted when the predefined state is detected;
   a synchronization detector that operatively receives the signal on the data line to detect at least one synchronization state, and accordingly generates a trigger signal, which is asserted when one of said at least one synchronization state is detected, wherein the synchronization detector is controlled by the clear control signal and the trigger signal becomes de-asserted when the clear control signal is asserted; and
   a compensation generator that operatively receives the trigger signal and accordingly generates a compensation signal when the trigger signal becomes asserted.

2. The system of claim 1, wherein the predefined state is composed of serial "1" bits; and the predefined state comprises a DIF-P state defined in physical layer specification M-PHY developed by Mobile Industry Processor Interface (MIPI) Alliance.

3. The system of claim 1, wherein the state detector comprises an AND gate that compares the signal on the data line with the predefined state; and the synchronization detector comprises an AND gate that compares the signal on the data line with the synchronization state.

4. The system of claim 1, wherein the asserted trigger signal is latched until the clear control signal is asserted; and the compensation signal becomes asserted only when the trigger signal is de-asserted at a preceding time and the trigger signal is asserted at a present time.

5. The system of claim 1, wherein the synchronization detector comprises:
   a lookup table that stores a plurality of synchronization states; and
   a compare circuit that compares the signal on the data line with one synchronization state retrieved from the lookup table.

6. The system of claim 1, wherein the compensation signal comprises a pulse of predetermined length.

7. The system of claim 1, wherein the compensation generator comprises:
   a first D flip-flop;
   at least one series-connected second D flip-flop that is connected in series with the first D flip-flop, a first one of said at least one second D flip-flop following the first D flip-flop; and
   an AND gate that operatively receives an output of the first D flip-flop and an inverted output of a last one of said at least one second D flip-flop, and accordingly generates the compensation signal;
   wherein the first D flip-flop operatively receives the trigger signal and accordingly generates an output that is operatively received by the first one of said at least one second D flip-flop.

8. A transmitter comprising:
   a post-cursor compensation system that operatively receives a signal on a data line and accordingly generates a compensation signal;
   a parallel-to-serial converter that operatively receives the signal on the data line and converts format of the signal from parallel format to serial format, thereby generating a serial signal;

a first driver configured to adjust the serial signal to generate an adjusted serial signal;

a second driver configured to adjust the compensation signal to generate an adjusted compensation signal; and an adder that superposes the adjusted compensation signal onto the adjusted serial signal;

wherein the post-cursor compensation system comprises:

a state detector that operatively receives the signal on the data line to detect a predefined state, and accordingly generates a clear control signal, which is asserted when the predefined state is detected;

a synchronization detector that operatively receives the signal on the data line to detect at least one synchronization state, and accordingly generates a trigger signal, which is asserted when one of said at least one synchronization state is detected, wherein the synchronization detector is controlled by the clear control signal and the trigger signal becomes de-asserted when the clear control signal is asserted; and a compensation generator that operatively receives the trigger signal and accordingly generates the compensation signal when the trigger signal becomes asserted.

9. The transmitter of claim 8, further comprising:

a first pre-driver operatively coupled between the parallel-to-serial converter and the adder; and a second pre-driver operatively coupled between the post-cursor compensation system and the adder.

10. The transmitter of claim 8, wherein the first driver comprises an adjusting adder and a first multiplier; the adjusting adder superposes a predetermined signal onto a signal outputted from the first pre-driver and the first multiplier multiplies a signal outputted from the adjusting adder with a first amplification factor to generate the adjusted serial signal; and the second driver comprises a second multiplier, which multiplies a signal outputted from the second pre-driver with a second amplification factor to generate the adjusted compensation signal.

11. The transmitter of claim 8, wherein the predefined state comprises a DIF-P state defined in physical layer specification M-PHY developed by Mobile Industry Processor Interface (MIPI) Alliance.

12. The transmitter of claim 8, wherein the state detector comprises an AND gate that compares the signal on the data line with the predefined state; and the synchronization detector comprises an AND gate that compares the signal on the data line with the synchronization state.

13. The transmitter of claim 8, wherein the asserted trigger signal is latched until the clear control signal is asserted; and the compensation signal becomes asserted only when the trigger signal is de-asserted at a preceding time and the trigger signal is asserted at a present time.

14. The transmitter of claim 8, wherein the synchronization detector comprises:

a lookup table that stores a plurality of synchronization states; and a compare circuit that compares the signal on the data line with one synchronization state retrieved from the lookup table.

15. The transmitter of claim 8, wherein the compensation signal comprises a pulse of predetermined length.

16. The transmitter of claim 8, wherein the compensation generator comprises:

a first D flip-flop;

at least one series-connected second D flip-flop that is connected in series with the first D flip-flop, a first one of said at least one second D flip-flop following the first D flip-flop; and an AND gate that operatively receives an output of the first D flip-flop and an inverted output of a last one of said at least one second D flip-flop, and accordingly generates the compensation signal;

wherein the first D flip-flop operatively receives the trigger signal and accordingly generates an output that is operatively received by the first one of said at least one second D flip-flop.

17. A method for post-cursor compensation, comprising:

receiving a signal on a data line to detect a predefined state and accordingly generating a clear control signal, wherein the clear control signal is asserted when the predefined state is detected;

receiving the signal on the data line to detect at least one synchronization state and accordingly generating a trigger signal, wherein the trigger signal is asserted when one of said at least one synchronization state is detected, and the trigger signal becomes de-asserted when the clear control signal is asserted; and receiving the trigger signal and accordingly generating a compensation signal when the trigger signal becomes asserted.

18. The method of claim 17, further comprising:

latching the asserted trigger signal until the clear control signal is asserted; and asserting the compensation signal only when the trigger signal is de-asserted at a preceding time and the trigger signal is asserted at a present time.

19. The method of claim 17, wherein the step of detecting the at least one synchronization state comprises:

storing a plurality of synchronization states; and comparing the signal on the data line with one synchronization state.

20. The method of claim 17, wherein the step of generating the compensation signal comprises:

providing a first D flip-flop and at least one series-connected second D flip-flop that is connected in series with the first D flip-flop, wherein a first one of said at least one second D flip-flop following the first D flip-flop; and performing a logic AND operation on an output of the first D flip-flop and an inverted output of a last one of said at least one second D flip-flop to accordingly generate the compensation signal;

wherein the first D flip-flop operatively receives the trigger signal and accordingly generates an output that is operatively received by the first one of said at least one second D flip-flop.

* * * * *